US 6,561,747 B2

(12) United States Patent  
Kenny et al.

(10) Patent No.: US 6,561,747 B2
(45) Date of Patent: May 13, 2003

(54) EJECTOR ARRANGEMENT FOR A WORK MACHINE

(75) Inventors: Peter M. Kenny, Sunderland (GB); Peter F. Prillinger, Dunlap, IL (US); David A. Young, Sunderland (GB)

(73) Assignee: Caterpillar S.A.R.L., Geneva ( * ) Notice: Subject to any disclaimer, the term of this patent is extended or adjusted under 35 U.S.C. 154(b) by 0 days.

(21) Appl. No.: 09/903,328

(22) Filed: Jul. 11, 2001

(65) Prior Publication Data

US 2002/0044861 A1 Apr. 18, 2002

Related U.S. Application Data

(60) Provisional application No. 60/217,613, filed on Jul. 11, 2000.

(51) Int. Cl.[7] .................................................. B60P 1/00
(52) U.S. Cl. ...................... 414/517; 414/521; 414/525.6
(58) Field of Search ................................ 414/511, 513, 414/517, 521, 525.6

(56) References Cited

U.S. PATENT DOCUMENTS

| 2,138,656 | A | * | 11/1938 | Gouldthorpe ............... 248/605 |
| 2,927,385 | A | | 3/1960 | Blomquist |
| 4,041,799 | A | * | 8/1977 | Teti ....................... 214/514 X |
| 4,253,529 | A | | 3/1981 | Nissen |
| 4,274,213 | A | | 6/1981 | Yadlowsky |
| 4,688,774 | A | * | 8/1987 | Warmuth, II ............ 267/64.21 |
| 4,798,088 | A | | 1/1989 | Haeg et al. |
| 5,058,685 | A | | 10/1991 | Moffitt |
| 5,087,168 | A | | 2/1992 | McKinnon et al. |
| 5,697,172 | A | | 12/1997 | Verseef |

FOREIGN PATENT DOCUMENTS

JP        6047733   *   3/1985   ................. 414/521

* cited by examiner

Primary Examiner—Steven A. Bratlie
(74) Attorney, Agent, or Firm—James R Smith; John J Cheek

(57) ABSTRACT

In the operation of work machines having an ejector blade pivotally coupled to a cylinder by cylinder-attached pivot pins, it has been a problem reducing the stress acting on the pivot pins caused by, for one example, improperly set yaw rollers. The present invention provides for an ejector arrangement for a work machine in which a coupler is pivotally coupled to the cylinder and pivotally coupled with the ejector blade.

20 Claims, 3 Drawing Sheets

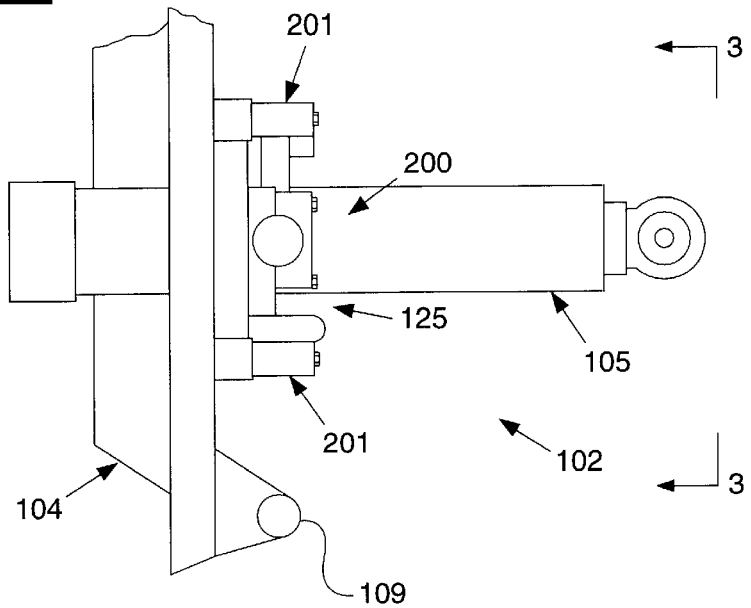
Fig-2-
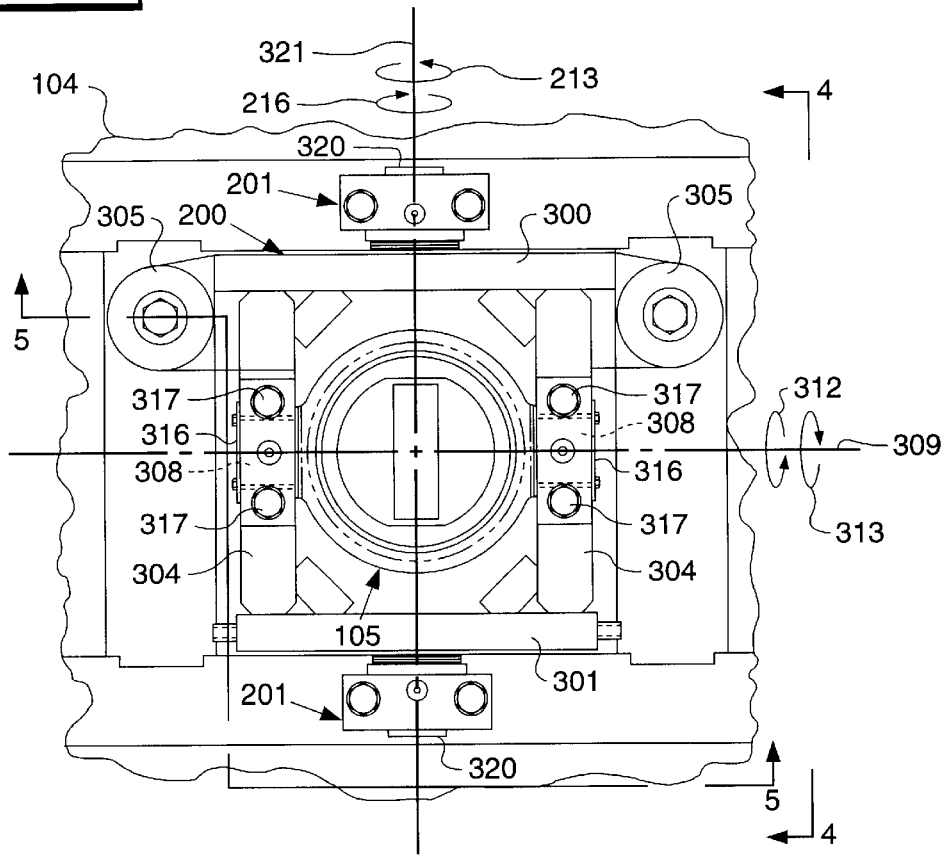
Fig-3-

EJECTOR ARRANGEMENT FOR A WORK MACHINE

This application claims the benefit of prior provisional patent application Ser. No. 60/217,613 filed Jul. 11, 2000.

TECHNICAL FIELD

The present invention relates generally to a an ejector arrangement for a work machine, and more specifically to a mounting apparatus used to couple an ejector blade to a hydraulic cylinder.

BACKGROUND

Work machines are used in earth moving operations to move material, such as dirt and rocks, from one location to another. An example of the aforementioned type of work machine is the ejector truck often advantageously utilized in those application in which space constraints limit or prohibit the raising of a truck bed such as is required for a conventional dump truck. Typically, the bed portion of an ejector truck remains attached to the bed portion chassis. An ejector blade is moveably mounted within the truck bed and is coupled to a hydraulic ram or cylinder comprising a plurality of sequentially extendable and retractable individual segments. The cylinder is typically coupled to the ejector blade by two trunnions or pivot pins disposed on opposite sides of the cylinder and co-linearly oriented, thereby allowing rotation of the ejector blade, relative to the cylinder, about an axis generally parallel with the floor of the bed. An example of such a cylinder coupling arrangement is shown in Patent Cooperation Treaty publication WO 99/15357 published on Apr. 1, 1999.

One drawback of prior art ejector-type work machines is the potential damage to the aforementioned trunnions caused by either an uneven load in the bed portion or, during ejector blade retraction, an obstruction contacting the ejector blade causing a tendency of the ejector blade to rotate about a substantially vertical axis substantially located at the point of attachment of the ejector blade with the hydraulic cylinder. To assist in preventing the aforementioned rotation, adjustable yaw rollers are typically provided on the ejector blade-mounted carriage portion to slidably engage the side walls of the truck bed. However, damage to the aforementioned trunnions and/or cylinder may result upon improper yaw roller adjustment requiring the trunnions to bear these loading conditions until the improperly adjusted yaw roller or rollers engage the side walls of the truck bed, thereupon transferring these loads to the truck bed. The present invention is directed to overcome one or more of the problems as set forth above.

SUMMARY OF THE INVENTION

In one aspect of the present invention, there is provided an ejector arrangement for a work machine of the type having a receptacle. The ejector arrangement includes an ejector blade, a cylinder, and a coupler pivotally coupled to the cylinder and pivotally coupled with the ejector blade.

In another aspect of the invention, a method of attaching a cylinder to an ejector blade in a work machine is provided. The method consists of pivotally attaching a first coupler member to a cylinder about a first longitudinal axis. The method also consists of providing a second coupler member attached with the ejector blade and pivotally attached to the first coupler member about a second longitudinal axis.

BRIEF DESCRIPTION OF THE DRAWINGS

FIG. 2 is a diagrammatic elevation view of the ejector arrangement of this invention.

FIG. 3 is a diagrammatic sectional view taken along lines 3—3 of FIG. 2.

DETAILED DESCRIPTION

Figure 1:
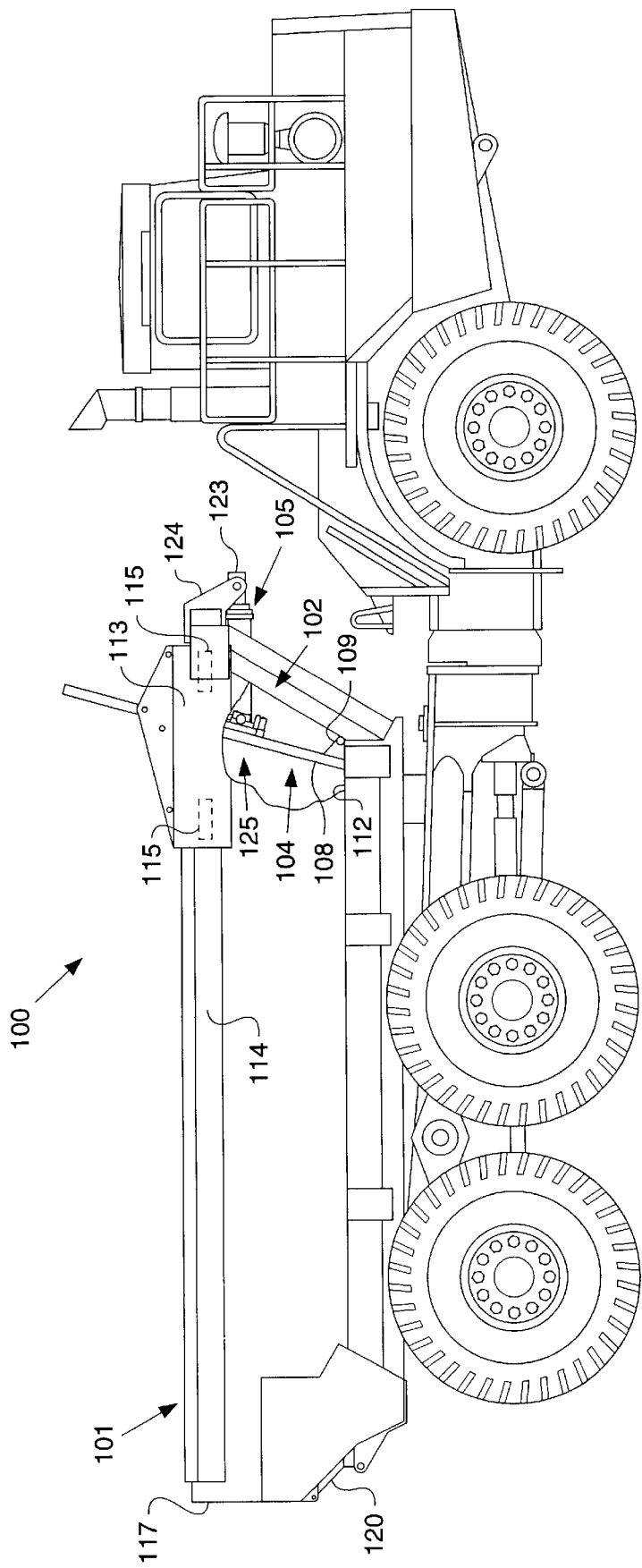
FIG. 1 is a diagrammatic elevation view, in partial cutaway, of a work machine having the arrangement of this invention.

With reference now to the Figures, a work machine is shown generally at 100 having an attached receptacle or bed portion 101 for holding materials to be transported to another location for unloading. To assist in removing the material from the bed portion 101, the work machine 100 is provided with an ejector arrangement 102 of the present invention which includes an ejector blade 104 coupled to the bed portion 101 by a multi-stage hydraulic ram or cylinder 105 which moves the ejector blade 104 relative to the bed portion 101. The ejector blade 104 is typically supported adjacent its bottom portion 108 by at least one roller 109 which moves across the floor 112 of the bed portion 101. The overall shape of the ejector blade 104 is such that it substantially conforms to the shape of the bed portion 101.

The ejector blade 104 is further attached to a carriage assembly 113 which slidably engages the side walls 114 of the bed portion 101 in response to movement of the cylinder 105. A pair of yaw rollers 115, attached to opposing sides of the carriage assembly 113, assists in maintaining proper orientation of the ejector blade 104 within the bed portion 101 by slidably engaging the side walls 114 in response to any tendency of the ejector blade 104 to pivot about an axis substantially normal to the bed portion 101. Activation of the cylinder 105 of the type described herein initiates a sequential elongation of the cylinder 105 causing a forcible contact between the materials deposited into the bed portion 101 and the ejector blade 104, with a continual elongation of the cylinder 105 resulting in the ejection of the materials from the bed portion back end 117, typically through a tailgate 120. Upon the ejection of the materials from the bed portion 101, the cylinder 105 may be reversibly operated causing retraction of the ejector blade 104 to bed loading position substantially as shown in FIG. 1.

The cylinder 105 is secured at one end 123 to a bracket 124 which is pivotally carried on the bed portion 101 for pivotal movement in a vertical plane in response to the extension and retraction of the cylinder 105. The ejector arrangement 102 of the present invention includes a coupler 125 used to couple the ejector blade 104 with the cylinder 105. As shown best in FIG. 2, the coupler 125 of the present invention consists of a first coupler member 200 pivotally attached to the cylinder 105, and a second coupler member 201 pivotally attached to the first coupler member 200 and attached with the ejector blade 104.

With reference now to FIG. 3, the first coupler member 200 comprises an upper member 300 and a lower member 301 both fixedly connected to two side members 304 spaced a sufficient distance apart to accommodate the cylinder 105 therebetween. A mounting flange 305 is preferably fixedly attached to the upper and side members 300,304 on opposing sides of the first coupler member 200. The first coupler member 200 is pivotally attached to the cylinder 105 by use of a pair of substantially co-linear first pivot pins 308, each preferably fixedly attached with the cylinder 105, both of which define a first longitudinal axis designated herein by reference numeral 309. As will be apparent to those skilled in such art, providing the aforementioned pivotal attachment allows for rotation of the ejector blade 104, relative to the cylinder 105, in the general direction of arrows 312,313. Each first pivot pin 308 is secured to a respective side member 304 by a removable bushing cap 316 preferably attached to each side member 304 by the use of preferably two fasteners 317.

Each of the upper and lower members 300,301 are provided with substantially co-linear second pivot pins 320, both defining a generally vertical second longitudinal axis designated herein by reference numeral 321. Each respective second pivot pin 320 is used to pivotally attach the second coupler member 201 to the first coupler member 200, thereby allowing for rotation of the ejector blade 104 relative to the cylinder 105 in the general direction of arrows 324,325. It is preferred that each respective axis 309,321 be substantially orthoganally oriented, relative to one another, thereby allowing the ejector blade 104 to pivot, relative to the cylinder 105, about both the vertical and horizontal axis 321 and 309.

As should be apparent to those skilled in such art, an advantage of providing the ejector blade 104 with the ability to rotate, relative the cylinder 105, about the second longitudinal axis 321 is that potentially damaging stresses which would otherwise be borne by the fist pivot pins 308 due to, for example, improper adjustment of one or more yaw rollers 115 are minimized until such time as ejector blade 104 rotation causes the yaw rollers 115 to engage the side walls 114, thereby transferring the aforementioned stresses to the side walls 114.

Figure 4:
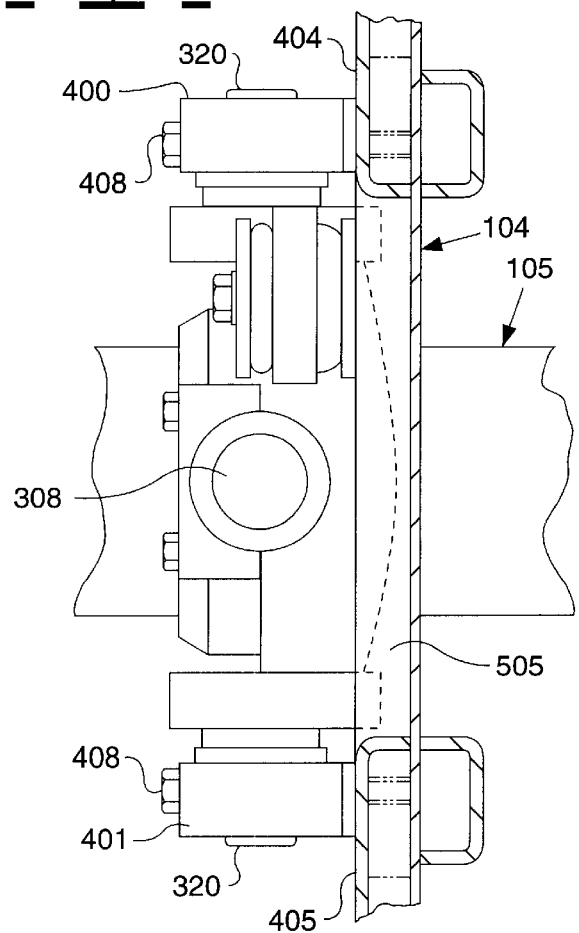
FIG. 4 is a diagrammatic sectional view taken along lines 4—4 of FIG. 3.

With reference now to FIG. 4, the second coupler member 201 preferably comprises an upper bearing assembly 400 and a lower bearing assembly 401 each pivotally mounted to a respective second pivot pin 320. As shown, the ejector blade 104 of the type described herein typically comprises a plurality of lateral support members with two such adjacent lateral support members designated herein as upper lateral support member 404 and lower lateral support member 405. Each respective bearing assembly 400,401 is preferably fixedly attached to, respectively, the upper and lower lateral support members 404,405 by use of mechanical fasteners 408.

Figure 5:
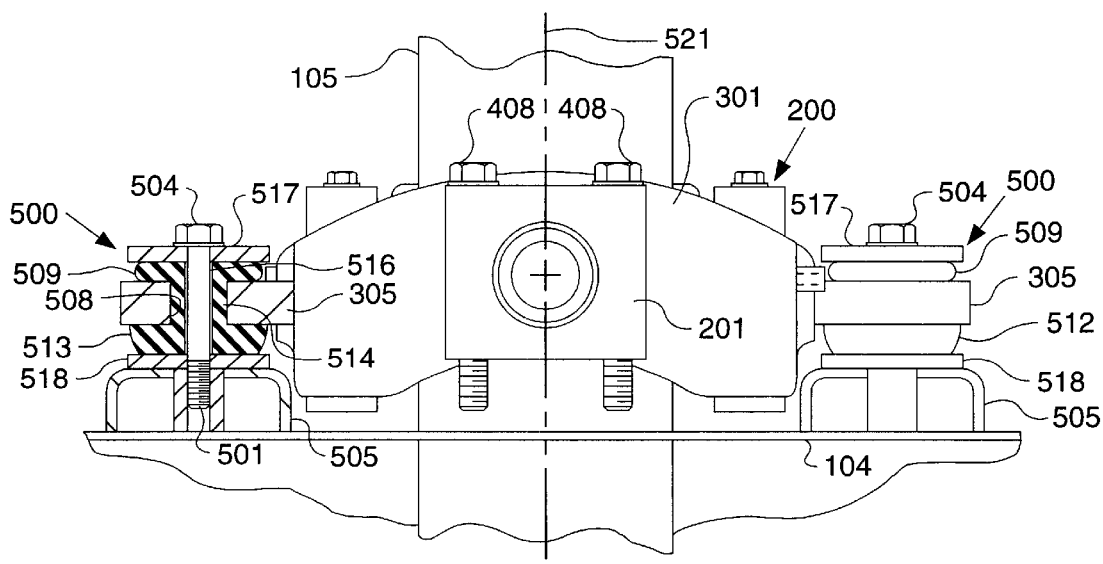
FIG. 5 is a diagrammatic sectional view taken along lines 5—5 of FIG. 3.

With reference now to FIG. 5, a bottom view of the coupler 125 is shown attached to the cylinder 105 and ejector blade 104 with the lower lateral support member 405 removed for clarity. As shown, the first coupler member 200 is preferably resiliently mounted to the ejector blade 104 by use of preferably a pair of resilient mounting structures 500. Each resilient mounting structure 500 comprises a fastener 501, having a head portion 504, preferably threadably attached to a vertical ejector blade support structure 505. Each respective fastener 501 is structured and arranged for reciprocative placement within an aperture 508 provided in each respective mounting flange 305. An upper resilient member 509, preferably comprising a resilient bushing made of rubber or other elastomeric type material, is concentrically placed about the fastener 501 substantially between each mounting flange 305 and head portion 504. Also provided is a lower resilient member 512 also preferably comprising a resilient bushing made of rubber or other elastomeric type material. As shown, the lower resilient member 512 comprises an enlarged portion 513, substantially interposed between the mounting flange 305 and the ejector blade 104, and a reduced portion 514 interposed between the fastener 501 and aperture 508.

To add increased stability to the resilient mounting structures 500, a substantially rigid sleeve 516 may be concentrically placed between the fastener and each respective resilient member 509,512. In addition, a washer 517 may be provided as shown and coupled to the fastener 501 preferably between the head portion 504 and upper resilient member 509. Furthermore, shims 518 may be placed between the lower resilient member 512 and the vertical ejector blade support structure 505 in order to assist in properly aligning the coupler 125, cylinder 105, and ejector blade 104.

As should be appreciated by those skilled in such art, upon either ejecting materials unevenly loaded in the bed portion 101 or the ejector blade 104 encountering an obstacle (not shown) in the bed portion 101 offset from the cylinder centerline 521, the ejector blade 104 may yaw or rotate about the second longitudinal axis 321 which, if undamped or otherwise compensated for, may create a noisy and potentially damaging resonant yaw effect.

Industrial Applicability

With respect to the drawings and in operation, the ejector arrangement 102 of the present invention includes an ejector blade 104, movably mounted within the bed portion 101, by use of the cylinder 105. A coupler 125 pivotally couples the ejector blade 104 to the cylinder 105 about two substantially orthogonal axis of rotation 309,321. The horizontal or first longitudinal axis 309 advantageously permits the ejector blade 104 to remain at substantially the same orientation, relative to the bed portion 101, despite any potential changed in orientation of the longitudinal axis of the cylinder 105 during cylinder 105 extension and retraction.

As should be appreciated by those skilled in such art, the introduction of the aforementioned second longitudinal axis 321 allows the ejector blade 104 to rotate about second longitudinal axis 321, relative to the cylinder 105, thereby transferring to the side wall 114, via the yaw rollers 115, any resultant stresses, forces and moments which otherwise would be placed on the first pivot pins 308.

The resilient mounting structures 500 assist in eliminating any potential resonant rotation of the ejector blade 104 about the second longitudinal axis 321 and/or the potential tendency of the ejector blade 104 to "walk" as it is being extended/retracted along the bed portion 101. Ejector blade-attached fasteners 501 are positioned in such manner as to pass through the apertures 508 provided in the mounting flanges 305 and to reciprocally move thereat in response to rotations of the ejector blade 104 about the second longitudinal axis 321. Dampening of the aforementioned potential resonant effects, each mounting flange 305 in sandwiched between an upper and lower resilient member 509,512 each concentrically placed about the fastener 501. Other aspects, objects and advantages of the present invention can be obtained from a study of the drawings, the disclosure and the appended claims.

What is claimed is:

1. An ejector arrangement for a work machine of the type having a receptacle, comprising:
   an ejector blade adapted for placement within the receptacle;
   a cylinder; and
   a coupler pivotally coupled to said cylinder and pivotally coupled with said ejector blade.

2. The ejector arrangement of claim 1 wherein said coupler comprises:
   a first coupler member pivotally attached to the cylinder about a first longitudinal axis; and
   a second coupler member pivotally attached to said first coupler member about a second longitudinal axis and attached with said ejector blade.

3. The ejector arrangement of claim 2 wherein said first and second longitudinal axis are substantially orthogonal.

4. The ejector arrangement of claim 2 including a resilient mounting structure for resiliently coupling said first coupler member to said ejector blade.

5. The arrangement of claim 4 wherein:
said first coupler member comprises a pair of opposing mounting flanges each having an aperture; and
said resilient mounting structure include (i) a fastener placed within each said aperture for reciprocal movement therein and attached to said ejector blade, and associated with each fastener (ii) an upper resilient member concentrically disposed about said fastener between said flange and a head portion of said fastener, and (iii) a lower resilient member concentrically disposed about said fastener between said flange and said ejector blade.

6. The arrangement of claim 5 including, associated with each fastener:
a substantially rigid sleeve disposed between said fastener and each said upper and lower resilient member; and
a washer coupled to said fastener between said head and said upper resilient member.

7. The arrangement of claim 5 wherein each said upper and lower resilient members comprises an elastomeric material.

8. An ejector arrangement for a work machine, comprising:
a bed portion;
an ejector blade disposed within said bed portion;
a cylinder; and
a coupler pivotally coupled to said cylinder and pivotally coupled with said ejector blade.

9. The ejector arrangement of claim 8 wherein said coupler comprises:
a first coupler member pivotally attached to the cylinder about a first longitudinal axis; and
a second coupler member pivotally attached to said first coupler member about a second longitudinal axis and attached with said ejector blade.

10. The ejector arrangement of claim 9 wherein said first and second longitudinal axis are substantially orthogonal.

11. The ejector arrangement of claim 9 including a resilient mounting structure for resiliently coupling said first coupler member to said ejector blade.

12. The arrangement of claim 11 wherein:
said first coupler member comprises a pair of opposing mounting flanges each having an aperture; and
said resilient mounting structure include (i) a fastener placed within each said aperture for reciprocal movement therein and attached to said ejector blade, and associated with each fastener (ii) an upper resilient member concentrically disposed about said fastener between said flange and a head portion of said fastener, and (iii) a lower resilient member concentrically disposed about said fastener between said flange and said elector blade.

13. The arrangement of claim 12 including, associated with each fastener:
a substantially rigid sleeve disposed between said fastener and each said upper and lower resilient member; and
a washer coupled to said fastener between said head and said upper resilient member.

14. The arrangement of claim 12 wherein each said upper and lower resilient members comprises an elastomeric material.

15. An ejector arrangement for a work machine, comprising:
a receptacle;
an ejector blade mounted in said receptacle;
a cylinder;
a first coupler member pivotally attached to the cylinder about a first longitudinal axis, said first coupler member having a pair of oppositely disposed mounting flanges each having an aperture;
a second coupler member pivotally attached to said first coupler member about a second longitudinal axis orthogonal with said first longitudinal axis and attached with said ejector blade; and
a resilient mounting structure for resiliently coupling said first coupler member to said ejector blade, said resilient mounting structure comprising (i) a fastener placed within each said aperture for reciprocal movement therein and attached to said ejector blade, and associated with each fastener (ii) an upper resilient member concentrically disposed about said fastener between said flange and a head portion of said fastener, (iii) a lower resilient member concentrically disposed about said fastener between said flange and said ejector blade, (iv) a substantially rigid sleeve disposed between said fastener and each of said upper and lower resilient member; and (v) a washer coupled to said fastener between said head and said upper resilient member.

16. The arrangement of claim 15 wherein each said resilient member comprises an elastomeric material.

17. A method of attaching a cylinder to an ejector blade in a work machine, comprising the steps of:
pivotally attaching a first coupler member to a cylinder about a first longitudinal axis;
providing a second coupler member attached with said ejector blade and pivotally attached to said first coupler member about a second longitudinal axis substantially orthogonal with said first longitudinal axis.

18. The method of claim 17 further comprising the step of resiliently coupling said first coupler member to said ejector blade.

19. A method of moving an ejector blade mounted in a work machine receptacle having a floor, comprising:
(a) moving the ejector blade from a retracted position to an extended position;
(b) during step (a), allowing pivotal movement between the ejector blade and said cylinder about an axis substantially parallel to the floor of said receptacle; and
(c) during step (a), allowing pivotal movement between the ejector blade and said cylinder about an axis substantially perpendicular to the floor of said receptacle.

20. The method according to claim 19 further comprising (d) dampening the pivotal movement allowed in at least one of steps (b) and (c).

* * * * *